Patented July 7, 1936

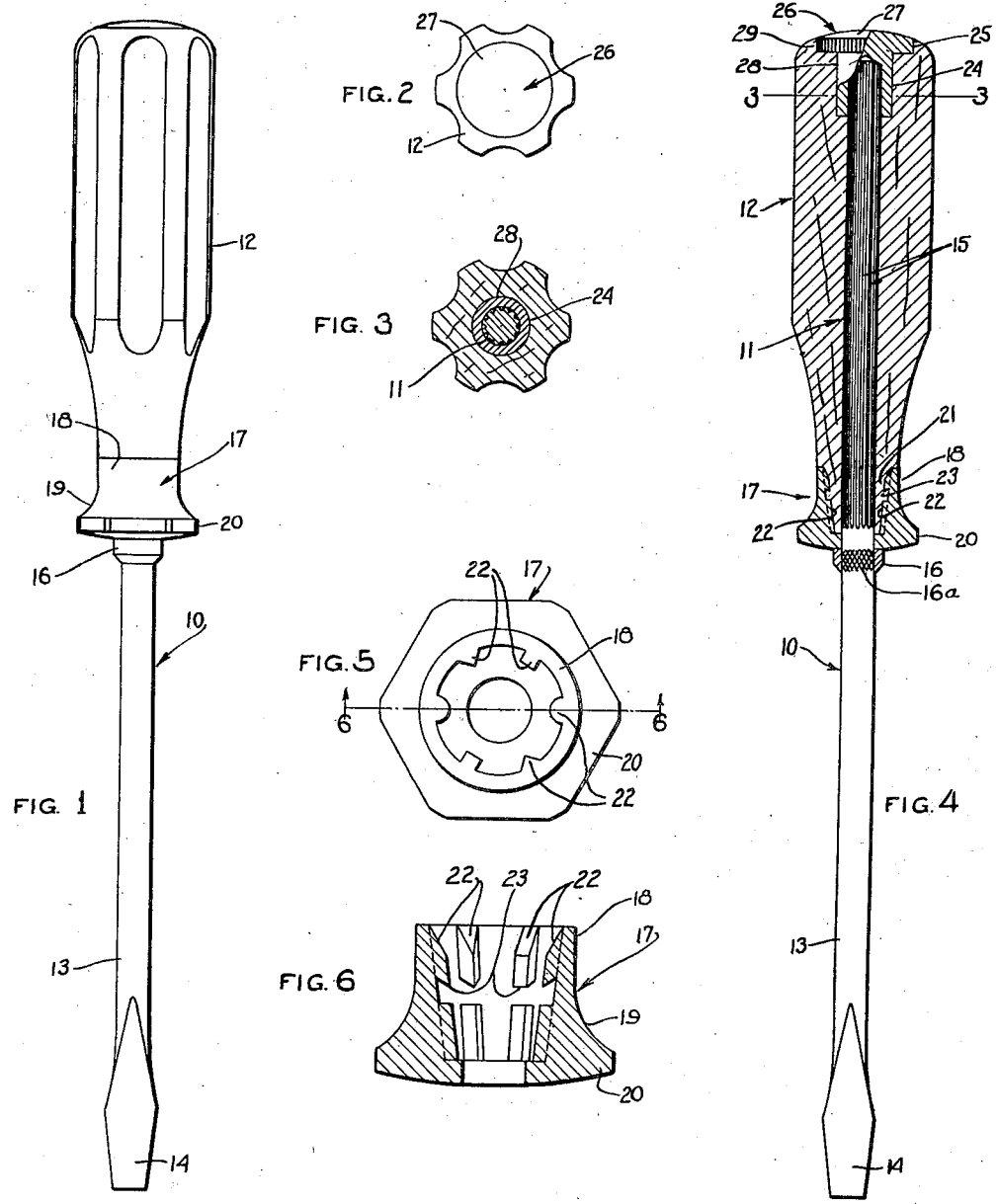

2,046,733

UNITED STATES PATENT OFFICE 2,046,733

HAND TOOL

Harold S. Forsberg, Stratford, Conn.

Application December 27, 1933, Serial No. 704,068

4 Claims. (Cl. 279—96)

This invention relates to new and useful improvements in hand tools and has particular although not exclusive relation to screw drivers.

An object of the invention is to provide a tool of rugged and economical construction.

Another object is to provide a tool including a handle, shank, and a ferrule for the handle, the ferrule being of improved construction whereby it will not turn on the handle and will not come off the handle.

Other objects and advantages will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

In the drawing:

Fig. 1 is a side elevational view showing a screw driver constructed according to the present invention;

Fig. 2 is an end elevational view of the handle of Fig. 1;

Fig. 3 is a transverse sectional view taken substantially along the line 3—3 of Fig. 4;

Fig. 4 is a longitudinal sectional view through the handle portion of the tool, the shank being shown in elevation;

Fig. 5 is an end elevational view on an enlarged scale showing the improved ferrule alone; and Fig. 6 is a sectional view taken substantially along the line 6—6 of Fig. 5.

Referring in detail to the drawing, the improved screw driver is shown as including a shank 10 comprising an inner end portion 11 disposed in a handle 12, and an outer end portion 13 flattened and shaped at its extreme end to provide a bit 14. The inner end portion 11 of the shank is provided with a series of longitudinally extending grooves providing a series of fine longitudinally extending ribs or fins 15. The ribs or fins 15 are arranged quite close together and are of slight depth whereby they are defined as "fine" to differentiate them from a structure wherein a few relatively heavy ribs are disposed about a shank.

Ribs 15 extend for a considerable portion of the length of the shank 10 and extend through to the inner end of the shank. After the shank is formed a collar or bushing 16 is slipped along the shank to the desired point and then welded to the shank. This bushing provides a means to limit movement of a handle onto the shank and also provides means whereby should the outer end portion of the handle be struck a severe blow the handle will transmit the force to the bushing which in turn will transmit it directly to the shank so that the handle will not be driven onto the shank in a manner to split the handle. This bushing or shoulder 16 also serves to prevent movement of a ferrule off a handle and along the shank as will later be more apparent. Since the shoulder or bushing 16 is in the form of a ring welded in place on the shank the shoulder is cheaply provided since it is not necessary to work up the same from the material of the shank as is necessary when the shoulder is forged with the shank. Before applying the bushing the shank is knurled as at 16a and the bushing is welded to this knurled portion whereby the bushing is more easily applied or secured in place.

Prior to assembling the handle 12 onto the shank 10 a ferrule 17 is secured on the handle. This ferrule comprises an internally tapered tubular portion 18, the outer surface of which is curved or flared as at 19 whereby to provide a flange 20, the outer edges of which are flattened. In the drawing this flange is shown as hexagonal although it will be understood that the flange may be provided with a greater or lesser number of flat sides. When the ferrule is in place on the handle as will later be described the flat sided flange 20 will prevent rolling of the handle when the same is placed on a flat surface. That is, one flat side of the ferrule may be brought into engagement with the surface and the handle and tool of which it forms part will not be free to roll.

The inner end portion 21 of the handle is also made with a slight taper and the handle and ferrule 17 are assembled by driving the inner end portion of the handle into the tubular portion 18 of the ferrule. To prevent separation of the handle and ferrule the inner surface of the tubular portion 18 of the ferrule carries a series of ribs 22 which are slightly spaced apart and which may have substantially any desired cross sectional configuration. As here shown, some of the ribs are semi-circular in cross section while others are substantially square and yet others are V-shaped.

When the inner end portion of the handle is driven into the ferrule, the ribs 22 dig or bite into the material of the handle as clearly shown in Fig. 4. This interlocking engagement between the handle and the ribs 22 serves to prevent any relative turning movement between the ferrule and handle. Also, since the ribs bite into the handle they serve to prevent separation of the handle and ferrule. To additionally guard against separation each rib is cut intermediate its ends whereby its upper portion at its inner end is under-cut or hooked shaped as shown at 23. With this arrangement it is practically impossible to pull the ferrule off the handle or to pull the handle out of the ferrule. When desired, the ribs 22 may be cut at several points to provide the shoulders 23.

Of course, if desired, the inner end portion or surfaces of the ribs at the cut need not be inclined or undercut as at 23. However, it is preferred that they be so shaped since they act somewhat as a fish hook and effectively prevent separation of the ferrule and handle. After the ferrule has been assembled on the handle the inner end portion 11 of the shank 10 is driven into an opening provided for it in the handle. The size of this opening is such that the inner end of the shank has a forced fit into the handle whereby the material of the handle is cut into by the ribs 15 so as to serve to secure the handle and shank together. Additionally, as the shank is forced into the handle the material of the handle is expanded between the ribs 22 on the tubular portion of the ferrule whereby the material of the handle completely fills said portion of the ferrule. As the material of the handle completely fills the tubular portion of the ferrule it will be apparent that the spaces provided between adjacent ends of the same ribs, when said ribs are cut as above described, will be filled so that the surfaces 23 of the ribs will bear against the material of the handle.

When the handle and ferrule are on the shank, the inner end of the ferrule should be in engagement with the shoulder or bushing 16 as clearly shown in Figs. 1 and 4. In its upper or outer end handle 12 is provided with a recess 24 which at the outer end of the handle is counter-sunk as at 25. The inner or ribbed end portion 11 of the shank extends into this recess 24 as clearly shown in Fig. 4 and the recess and counter-sink are filled by a plug 26. This plug 26 includes a button-like head portion 27 and a shank or stem portion 28, the latter being hollow for substantially its entire length and open at its lower or inner end. With the handle assembled on the shank this plug is partially inserted into the opening 24 whereby to bring the opening in the shank portion of the plug into registry with the end of the ribbed or finned portion of the shank. Thereafter, the plug is driven into the opening 24 the fit between the plug and shank being such that the ribs of the shank cut into the plug. At the same time the head portion or button-like portion 27 of the plug is seated in the counter-sink 25 so that the outer surface of portion 27 is flush with and forms part of the end surface of the handle. If desired, the edge of portion 27 may be knurled as at 29 whereby to cut into the surrounding portion of the handle.

From the foregoing description it will be apparent that if a blow is struck on the outer end of the screw driver the plug 26 will receive the blow and will immediately transmit it directly to the shank 10. Owing to the manner in which the ribs 22 of the ferrule cut or bite into the handle it will be apparent that the ferrule is effectively secured to the handle both against turning movement on the handle and against movement off the handle. Any downward pressure on the handle is transmitted directly by the ferrule to the bushing or shoulder 16 welded to the shank. It is particularly noted that no pin or other means is passed through the ferrule handle and shank to hold the ferrule in place. When such a means is employed, the inner end portion of the shank must be softened so that it may be drilled and thereafter should the tool be used as a lever the shank easily bends.

The ferrule having a flat sided flange will serve to prevent the tool from rolling should the tool be deposited on a flat surface. Also, the flared flange 20 forms a guard piece against which a thumb may be pressed to exert a pressure longitudinally of the tool. The flange prevents the hand of the operator from slipping over the handle of the tool. While the invention has been described with particular reference to a screw driver it will be understood that certain features of the invention may be employed in connection with other tools and it is therefore to be understood that the invention is not limited to the embodiment disclosed and that the various features of the invention are to be covered irrespective of whether they are embodied in a screw driver or other tool.

Having thus set forth the nature of my invention, what I claim is:

1. In a tool, a shank having an inner end portion and an outer end portion, fine ribs on the inner end portion of said shank and extending to the extreme inner end thereof, a handle on the inner end portion of the shank, said shank extending substantially entirely through the handle, said ribs biting into the material of the handle whereby to secure the handle and shank together against relative turning movement, a plug in the outer end portion of said handle, said plug including a head forming the central portion of the outer end surface of the handle, and said plug having a driving fit onto the ribbed inner end of said shank with said ribs biting into the material of the plug and securing the plug and shank together.

2. In a tool, a shank having an inner end portion and an outer end portion, fine ribs on the inner end portion of said shank to the extreme inner end thereof, a handle on the inner end portion of the shank, said ribs biting into the material of the handle whereby to secure the handle and shank against relative turning movement, a plug in the outer end portion of said handle, said plug including a head forming the central portion of the outer end surface of the handle, said plug having a driving fit onto the ribbed inner end of said shank and said ribs biting into the material of the plug and securing the plug and shank together, a ferrule on the inner end portion of said handle, and a shoulder on said shank in engagement with the inner-most surface of said ferrule.

3. In a tool, a shank having an inner end portion and an outer end portion, fine ribs on the inner end portion of said shank and extending to the extreme inner end thereof, a handle on the inner end portion of the shank, said inner end portion of the shank extending substantially entirely through the handle, said ribs biting into the material of the handle whereby to secure the handle and shank together against relative turning movement, a plug in the outer end portion of said handle, said plug including a relatively long tubular portion entering the outer end of the handle and a relatively flat head closing the outer end of said tubular portion and forming the central portion of the outer end surface of the handle, and said plug having its tubular portion driven onto the extreme inner end of said shank with said ribs biting into the material of the plug and securing the plug and shank together with the end of the shank against the head of the plug.

4. In a tool, a shank having an inner end portion and an outer end portion, fine ribs on the inner end portion of said shank and extending to the extreme inner end thereof, a handle on the inner end portion of the shank, said inner end portion of the shank extending substantially entirely through the handle, said ribs biting into the material of the handle whereby to secure the handle and shank together against relative turning movement, a plug in the outer end portion of said handle, said plug including a relatively long tubular portion entering the outer end of the handle and a relatively flat head closing the outer end of said tubular portion and forming the central portion of the outer end surface of the handle, said plug having its tubular portion driven onto the extreme inner end of said shank with said ribs biting into the material of the plug and securing the plug and shank together with the inner end of the shank against the head of the plug, a ferrule on the inner end portion of said handle, and a shoulder on said shank in engagement with the innermost surface of said ferrule.

HAROLD S. FORSBERG.